United States Patent [19]
Peck et al.

[11] 3,919,086
[45] Nov. 11, 1975

[54] SEWAGE TREATMENT APPARATUS

[75] Inventors: David F. Peck; Joseph C. Troy, both of Pittsburgh, Pa.

[73] Assignee: NUS Corporation, Rockville, Md.

[22] Filed: Sept. 11, 1973

[21] Appl. No.: 396,266

[52] U.S. Cl. .............................. 210/197; 210/221
[51] Int. Cl. ............................................. C02c 1/08
[58] Field of Search .......................... 210/2–8, 20, 210/14, 15, 170, 194–197, 221, 521, 532 S

[56] References Cited
UNITED STATES PATENTS

| | | | |
|---|---|---|---|
| 1,642,206 | 9/1927 | Imhoff | 210/197 |
| 2,272,026 | 2/1942 | Spaulding | 210/20 |
| 2,684,941 | 7/1954 | Pasveer | 210/195 UX |
| 2,938,867 | 5/1960 | Griffin | 210/20 |
| 3,251,471 | 5/1966 | Allen | 210/197 |
| 3,400,822 | 9/1968 | McKeown | 210/197 X |
| 3,618,779 | 11/1971 | Goodman | 210/195 |

FOREIGN PATENTS OR APPLICATIONS

| | | | |
|---|---|---|---|
| 288,388 | 11/1915 | Germany | 210/195 |
| 358,106 | 9/1922 | Germany | 210/195 |

Primary Examiner—Samih N. Zaharna
Assistant Examiner—Robert H. Spitzer
Attorney, Agent, or Firm—Sughrue, Rothwell, Mion, Zinn & Macpeak

[57] ABSTRACT

A technique for modifying a conventional Imhoff tank, which utilizes an anaerobic wastewater treatment process, to obtain an activated sludge system which is an aerobic process, the modifications comprising providing a plurality of air sparges in the lower portion of the digestion chamber of the Imhoff tank to aerate the wastewater contained therein, providing a pump means in the tank which has its suction end near the apex of the inverted pyramid-bottom of the tank and its discharge end disposed in the gas vent area of the tank, and relocating the feed to the tank into the gas vent areas rather than into the center settling compartment which is conventional. Also disclosed is the modified apparatus comprising the standard Imhoff tank elements and the new elements provided by the technique of the present invention.

4 Claims, 7 Drawing Figures

SEWAGE TREATMENT APPARATUS

BACKGROUND OF THE INVENTION

1. Field of the Invention

The present invention relates to an apparatus for treating wastewater containing organic pollutants and more particularly to an apparatus useful in treating sanitary sewage which comprises an Imhoff tank which has been converted into an aeration system.

2. Description of the Prior Art

The treatment of wastewater containing organic pollutants is an old and well known field. Sanitary sewage is the most prominent wastewater falling into this class, and various processes and apparatus have been known in the past for treating sanitary sewage in order to remove and destroy the suspended and dissolved organic matter contained therein.

Broadly, processes for treating sanitary sewage can be classified into two classes, aerobic and anaerobic. The first is generally characterized by the decomposition of the organic solids contained in the sewage in the presence of air by the action of the bacteria also present therein. An anaerobic process, which has also been termed digestion in the past, is a process whereby the organic solids are decomposed in the absence of air by the action of the bacteria. The main purpose for the decomposition, whether it be aerobic or anaerobic, is to reduce the amount of solids, by decomposition thereof, which must be ultimately disposed of.

Various types of apparatus have been known in the past useful in both the aerobic and anaerobic processes. Perhaps one of the better known devices is the so-called Imhoff tank which is an apparatus in which an anaerobic process is conducted. The Imhoff tank is a relatively old and inefficient device, by today's standards, and removes only settleable solids. It has little effect on dissolved organic materials and other fine suspended matter contained in the sewage. If properly designed, an Imhoff tank is capable of removing about 50 to 65% of the suspended solids and from 25 to 40% of $BOD_5$ of the sewage fed to the device. The latter is a parameter used to measure the biodegradable pollutants present in the wastewater or sanitary sewage being treated, as is well known to those skilled in the art.

Before the modern aeration systems were devised, the Imhoff tank was widely used. The usefulness of the Imhoff tank today is rather limited as it is used only for relatively small applications, such as small industrial facilities and even individual households. An advantage of the Imhoff tank is that it is simple to operate and does not require skilled supervision. Further, there is no mechanical equipment to maintain and the actual operation steps are relatively simple.

Referring to FIGS. 1, 2 and 3, a typical Imhoff tank is shown. Such tanks are generally rectangular as is shown, the tank generally being designated 10. Referring to the figures, a rectangular frame composed of end walls 23 and side walls 24 define the tank. The side walls have angled bottom portions 20 and 21 (see FIG. 3) and the end walls have angled bottom portions 25 and 26 (see FIG. 2), which define an inverted pyramid. The influent wastewater or sewage is fed to a settling chamber 11 disposed in the center of the tank and defined by upstanding members 15 having angled lower portions 16 and 17. The last-mentioned members define a slot 18 through which the settleable solids will pass downward into digestion chamber 12, as indicated in FIG. 3. The solid material will settle through slot 18 and will accumulate at the bottom of the digestion chamber. The settled solids will be decomposed therein in the absence of air by the action of the bacteria present in the wastewater or sewage. Gases such as methane and nitrogen will be formed during this degradation process, and the gases will escape through gas vent sections 13 in the upper portion of the tank.

The water in the uppermost portion of the settling chamber 11 will be relatively clearer than the influent water and will exit from the tank by flowing over exit weir 14, the level of the fluid within the tank being designated 22 in the figures.

In normal operation, the digestion is allowed to proceed for an extended period of time, such as several months, and thereafter digested sludge solids accumulated in the bottom portion of the digestion chamber 12 are withdrawn therefrom (by means not shown) and dewatered by suitable means, which operation substantially decreases the volume of solids that need to be removed. It has been proposed to heat the tank to increase the rate of decomposition of the sludge, since this will occur faster at elevated temperatures, thus lessening the storage capacity required. Another proposal involves the mechanical removal of sludge rather than merely pumping it out of the digestion chamber.

A small amount of scum may accumulate in the settling chamber 11 and may be removed by suitable means.

In a conventional design, the settling chamber or compartment 11 is designed to have a surface overflow rate, (i.e., a parameter indicating the amount of liquid fed to a certain size settling tank which relates closely with the effectiveness of removal of the suspended solids in the fluid) of about 600 gallons per day per square foot of surface area in the tank. The fluid will normally have a detention period (i.e., the average holding period of a given volume of water in the tank) of about 3 hours at the optimum rate of flow. Normally, the capacity of an unheated digestion compartment will normally provide for about 6 months of storage of sludge during the cold portion of the year, which of course may be reduced by providing heat thereto.

It has been recognized that the Imhoff tank is a relatively inefficient apparatus since it removes only a portion of the suspended solids and does not have any effect or very little effect on dissolved organic materials and fine suspended matter.

A relatively newer and more efficient process is the activated sludge process. FIG. 4 schematically shows a typical activated sludge process wherein the influent wastewater or sewage is fed to a compartment in which it is aerated. Thereafter, the aerated fluid is fed to a settler wherein the sludge settles to the bottom and clear effluent is withdrawn from the top thereof. A sludge recycle is provided to the aeration compartment as shown in FIG. 4.

The activated sludge process is capable of removing 90 to 95% of the suspended solids contained in the fluid and further it removes from 90 to 95% of the $BOD_5$. Essentially, this is accomplished by decomposition in the presence of air by the action of the bacteria present in the fluid. A large population of bacteria operates to decompose the waste, and the end products of the decomposition are carbon dioxide gas and new bacteria cells. The bacteria grow in the aeration compartment and consume the organics in the waste. In this compartment, the bacteria (which are small enough to be individually invisible) tend to agglomerate together into visible particles known as floc. The material in the aeration tank is maintained in suspension by the mixing action resulting from the introduction of air into the tank as shown in FIG. 4. The retention time of the fluid in the aeration tank and in the settling tank will of course vary depending upon the specific character of the organics contained in the waste material, upon the temperature of the system, the size of the apparatus, the amount of air injected, etc. Normally, the aeration tank would have a retention time of from 6 to 24 hours. For systems with retention times approaching 24 hours, there is generally much less sludge washing required due to auto-oxidations of certain of the cells. These systems are generally referred to as extended aeration plants.

The sludge recycle is inherent to the success and improved efficiency of the activated sludge process, and a positive sludge return, as is indicated in FIG. 4, is often required by either federal or state regulations concerning treatment of sanitary sewage.

The fluid, containing the suspended floc and possibly some suspended unconsumed organic matter, is removed from the aeration compartment and is fed to a settler or clarifier where the suspended material (floc, etc.) settles to the bottom thereof. The clear effluent is discharged as treated waste having a low suspended solids content and a low $BOD_5$ content. The clarifier compartment has standard overflow rates such as from 200 to 800 gallons per day per square foot of area, and retention time is on the order of about 2 to 4 hours, which rates and times may vary depending on factors such as those above mentioned. The particular size and shape of the various compartments are not particularly limited, and are normally controlled by hydraulic considerations. Generally, the shape and general configuration thereof can be varied at will as long as the underlying objectives as above-outlined are accomplished.

U.S. Pat. No. 3,251,471 Allen discloses a sewage disposal system which is designed to provide a treatment plant for sewage wherein the Imhoff and anaerobic processes are carried out in a single combined unit aerobic in nature. Referring to FIG. 1 of the patent, the apparatus comprises a primary digest chamber and an adjacent sludge separation tank or chamber separated from each other by a vertical partition. Vent slots are provided along the sides of each chamber. The raw sewage is fed into the primary digest chamber and subsequently downwardly into the settling chamber located below the digest chamber. Aeration pumps circulate the sewage between the settling chamber and the digest chamber with the sewage flowing from the digest chamber to the settling chamber and then upwardly into the adjacent sludge separation chamber and then over a weir into an outlet chamber. The sludge settles out into the bottom of the tank where it can be removed via a suitable withdrawal means.

U.S. Pat. No. 3,400,822 McKeown teaches an extended aeration system comprising a primary and a secondary aeration compartment as well as a settling compartment communicating with both aeration compartments. The raw sewage introduced into the primary aeration compartment flows therefrom into the settling compartment where liquid may be removed from the upper end thereof, with the sludge being removable from the lower end. A diffusion means imparts a whirling flowpath to the liquid in the secondary aeration compartment wherein the whirling liquid circulating past the passageway communicating between the secondary aeration compartment and the settling compartment withdraws sludge from the lower end of the settling compartment into the secondary compartment where an airlift pump located in the secondary aeration compartment circulates liquid and sludge to the primary aeration compartment.

U.S. Pat. No. 3,339,741 Bernard et al. discloses an apparatus for the biological purification of wastewater. The device is useful for performing a process known as the activated sludge process. A centrally located aeration zone is provided and is separated from two settling zones by a wall having a vertical upper portion and an inclined lower portion. The aerators are located such that a circular flow of sewage is induced in the aeration zone which sweeps upwardly past the passageway between the upper and lower inclined portions of the dividing wall so as to induce a flow from the settling zone to the aeration zone.

Reference is made to the following U.S. patents for disclosure of other types of sewage treatment devices: U.S. Pat. Nos. 1,893,623, 3,439,807 and 3,442,802.

In view of the relatively poor efficiency of the Imhoff tank, it would be desirable to replace the same with the more efficient activated sludge facility. However, the latter is considerably more expensive and more difficult to operate than the former. Therefore, there is a need for another solution to the problem of the efficiency of the Imhoff tank of the prior art.

SUMMARY OF THE INVENTION

It is therefore a primary object of the present invention to provide a means for converting an Imhoff tank into an activated sludge facility.

It is a further object of the present invention to accomplish this conversion with a minimum degree of modifications to the standard Imhoff tank or similar settler/digester.

It is yet a further object of the present invention to accomplish the conversion for a substantially lower cost than the corresponding cost necessary to completely replace the Imhoff tank with an activated sludge facility of the same size.

It is yet another object of the present invention to provide an activated sludge apparatus for treating sanitary sewage, and other wastewater containing organic pollutants, derived from an Imhoff tank, which has an efficiency equal to or greater than the efficiency of conventional activated sludge facilities.

Other objects and advantages will become apparent from the ensuing description.

The above objects are accomplished by the present invention which provides a simple, yet effective, technique for converting conventional Imhoff tanks into activated sludge facilities. The conversion is accomplished by relocating the feed from its normal position in the center settling compartment to one of the gas vent slots along the side of the Imhoff tank. Air sparges are installed along the bottom of both sides of the large bottom digestion compartment, and lastly a simple airlift pump is installed having its suction end at the very bottom of the inverted pyramid of the digestion chamber with its discharge into the gas vent area at the top of the tank near where the influent feed enters the device. Since the feed enters the outer compartment through the vents, it must flow upward through the slot in the bottom of the settling chamber to reach the exit. In flowing upwardly through this narrow slot, the aerated feed stock carries some floc with it due to its velocity. However, as the settling chamber widens, the velocity slows and the suspended particles come to an equilibrium position forming a fluidized sludge bed through which the water must rise. This fluidized bed functions as a strainer and tends to filter out and agglomerate the finer particles resulting in water of exceptional clarity.

DESCRIPTION OF THE PREFERRED EMBODIMENTS

Figure 1:
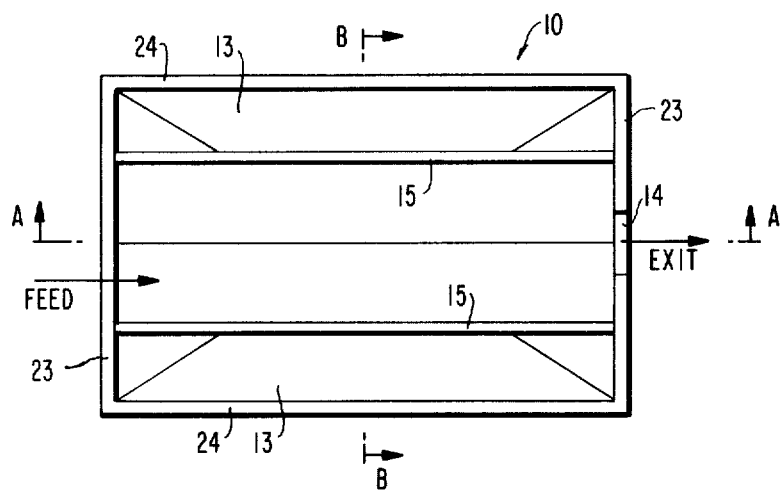
FIG. 1 shows a plan view of a standard Imhoff tank.
Figure 2:
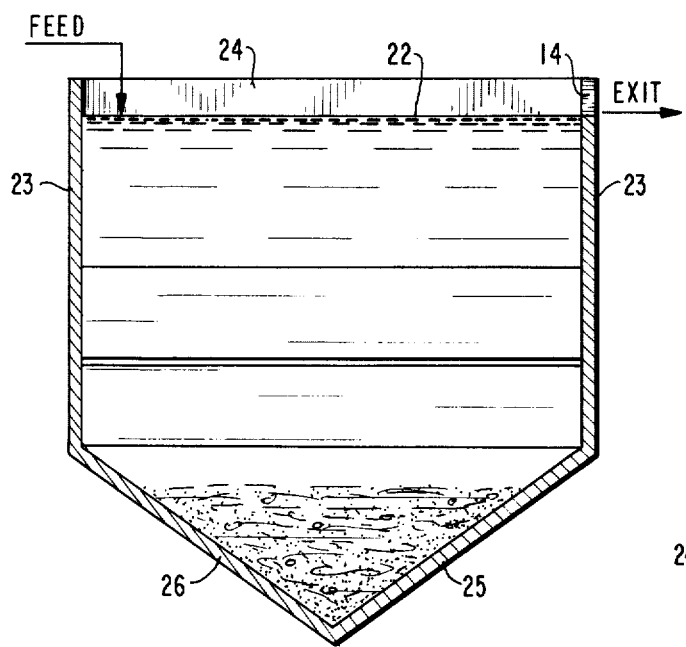
FIG. 2 shows a cross-section of FIG. 1 taken along the line A—A.
Figure 3:
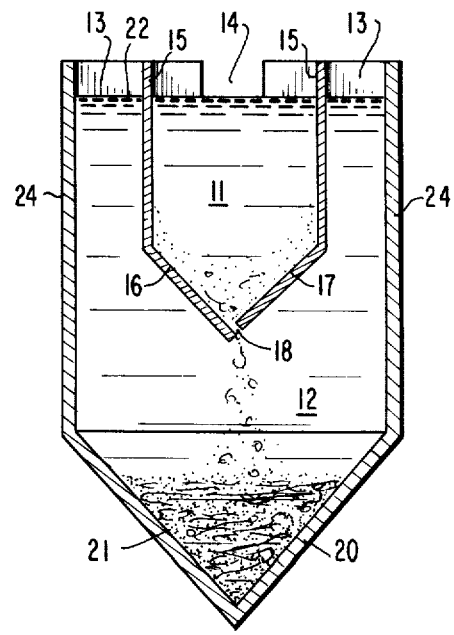
FIG. 3 is another cross-section of the Imhoff tank of FIG. 1 taken along the line B—B.
Figure 5:
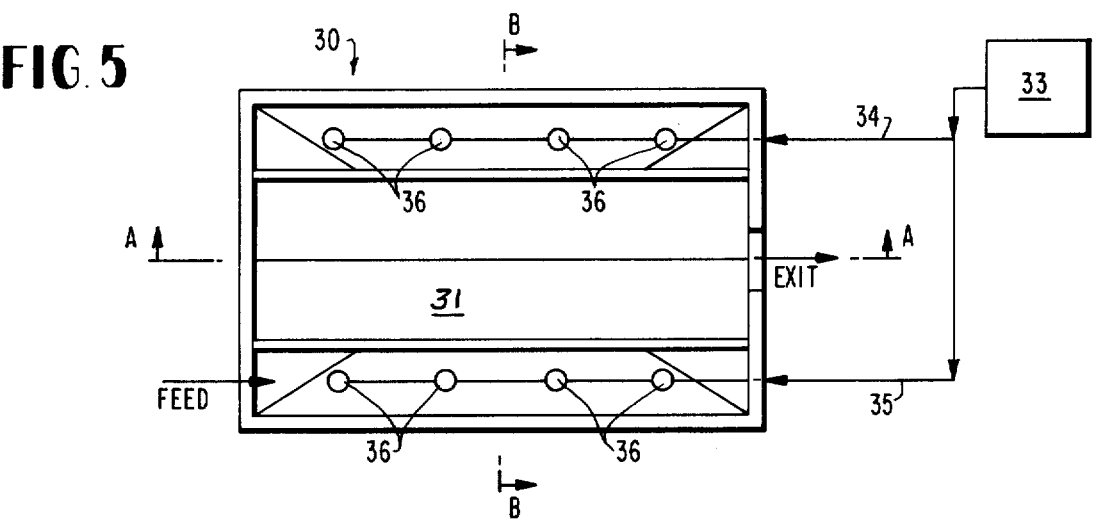
FIGS. 5, 6 and 7 represent the improved apparatus of the present invention, FIG. 6 being a cross-section of the plan view of FIG. 5 taken along the line A—A and FIG. 7 being a cross-section of FIG. 5 taken along the line B—B.
Figure 6:
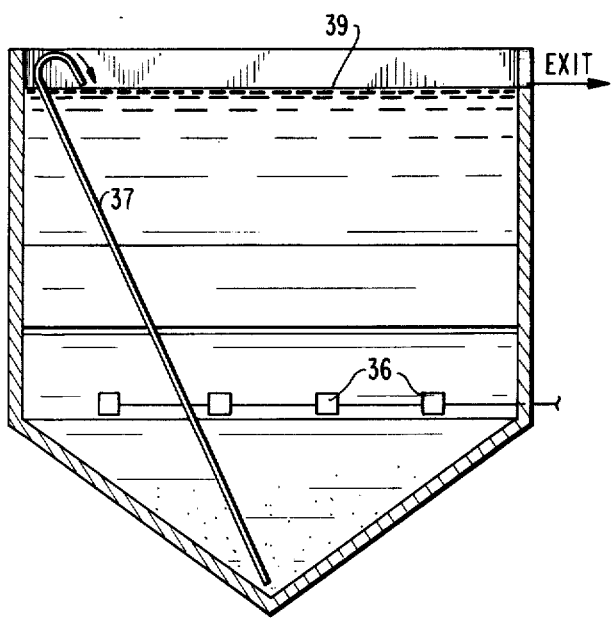
Figure 7:
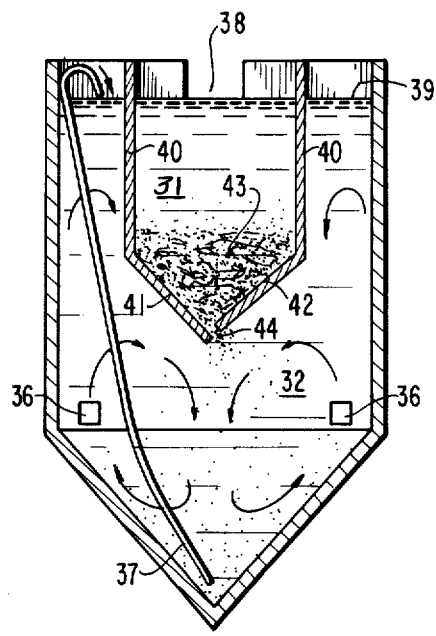

The modified Imhoff tank of the present invention (in effect converted into an activated sludge system) is schematically shown in FIGS. 5, 6 and 7, wherein like parts refer to the parts shown in FIGS. 1, 2 and 3, respectively. Only the more significant of the parts will be discussed below.

The apparatus of the present invention takes the general form of the Imhoff tank discussed above, and is generally designated 30 in FIG. 5. An upper settling compartment 31 and a lower digestion chamber 32 comprise the inner portions of the tank. As noted in FIG. 5, the feed enters one of the vent areas and, as a result of this point of feeding, must flow downwardly into digestion chamber 32 and then through slot 44 formed between inclined members 41 and 42 of the sidewalls 40 defining the settling compartment 31. A source of air 33 is provided which, via lines 34 and 35, feeds air sparges 36 located toward the bottom of digestion chamber 32 as shown in FIGS. 6 and 7. An airlift pump 37 is also provided with its suction end at or very near the bottom of the inverted pyramid formed by the bottom of the digestion chamber 32. Its discharge is in one of the vent areas as shown in FIG. 7.

The sloping bottom of the digestion chamber 32 and the sloping members 41 and 42 forming the base of the settling compartment 31 assist the air sparges in producing a double rolling action of fluid in the digestion chamber, as shown by the arrows in FIG. 7. The airlift pump picks up any settleable matter which may tend to accumulate at the lowermost portion of the digestion chamber 32, and returns it to the top of the tank in the vent area near the feed.

The normal discharge point is left unmodified at one end of the original center settling chamber, and the clear fluid flows over exit weir 38 as indicated in FIGS. 5 and 7, the water level being indicated by 39 in FIGS. 6 and 7. Since the feed enters the vent area of the outer compartment, it must flow upwardly through the slot 44 in the bottom of the settling chamber 31 to reach the exit weir 38. Slot 44 should be no less than 6 inches in width. In flowing upwardly through this narrow slot, the feed (aerated in digestion chamber 32) carries some floc with it due to its velocity. However, as the settling chamber widens, the velocity of this stream decreases and the suspended particles come to an equilibrium position. This forms a fluidized sludge bed 43 (see FIG. 7) through which the water must rise toward the exit. This fluidized bed 43 functions as a strainer and tends to filter out and agglomerate the finer particles producing water of exceptional clarity in the upper portion of settling chamber 31.

Figure 4:
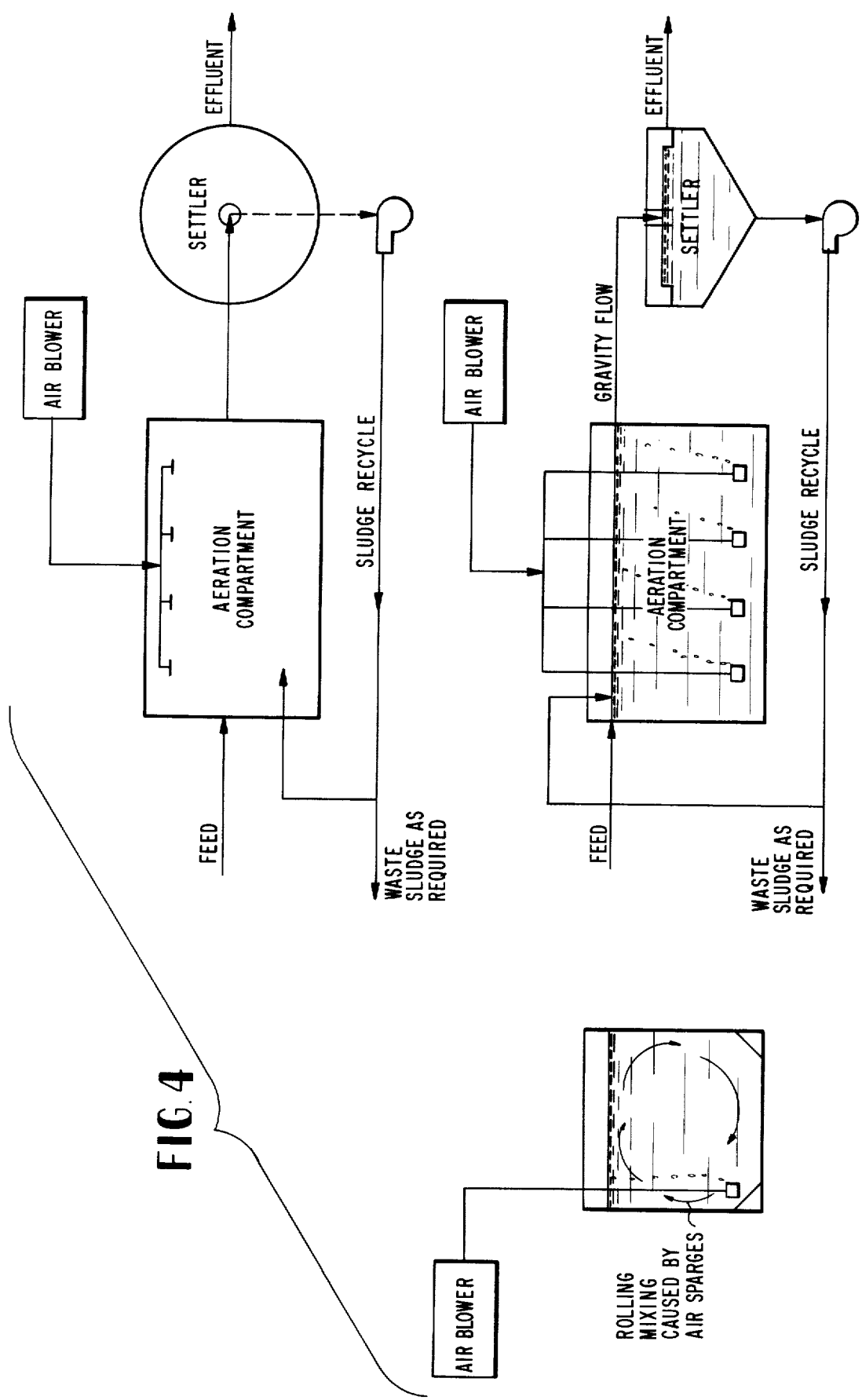
FIG. 4 is a schematic flow sheet of a conventional activated sludge process.

After a certain period of time, the amount of sludge fluidized in bed 43 reaches a point where the upward velocity of the water flowing therethrough can no longer support it. At this point, sludge starts to go both ways through slot 44. The situation is in equilibrium so the quantity of sludge suspended in bed 43 remains constant with time, and the amount of sludge falling out of the bottom of the slot 44 toward the bottom of digestion chamber 32 represents the sludge return amount shown in the sludge recycle stream in FIG. 4.

The feed, of course, can be made to both vent areas on either side of the settling chamber 31, and if necessary, two airlift pumps can be provided to return the sludge from the bottom of the device to the vent area adjacent each feed point. The primary reason why the modified device of the present invention does produce water of exceptional clarity is that the incoming feed must flow upwardly through the fluidized sludge bed 43 which aids the decomposition initiated by the aeration in chamber 32 and functions to remove and agglomerate the finer particles suspended in the incoming sewage.

The technique of the present invention converts a conventional inefficient Imhoff tank into a very efficient activated sludge facility at a cost which is substantially less than the initial cost of a new activated sludge facility. Thus, the present invention remedies a problem which has long been seeking a solution and since the modification of the present invention involves relatively few changes, its advantages are obvious.

The size of the modified tank of the present invention is of course dependent upon the initial size of the Imhoff tank prior to modification, and as stated above, this can vary depending upon the requirements for the particular installation. If necessary, heating means can be provided to increase the rate of decomposition of the aerated sludge in compartment 32 of the device of the present invention. In addition, the number of air sparges can be varied as desired to achieve an optimum amount of air in the aeration compartment.

The efficiency of the modified device of the present invention is essentially equal to the efficiency obtained with conventional activated sludge systems, and meets or exceeds the present federal and state standards concerning removal of organic pollutants from wastewater including sanitary sewage.

The rate of air injection into the device of the present invention can be determined empirically by those skilled in the art with a minimum degree of experimentation, as can the rate of pumping of the sludge from the bottom of compartment 32 through the airlift pump to the surface of the fluid in the device.

In a standard Imhoff tank, there is normally a minimum six-inch clearance in the slot formed by the inclined lower members of the upper settling compartment, and this is satisfactory for the modified device of the present invention. There is no critical upper limit of the slot dimension, but of course it should not be so wide as to prevent the formation of the fluidized bed in the lower portion of the settling chamber. The optimum dimension of the slot can be determined with a minimum degree of experimentation by those skilled in the art, given the above considerations.

It should be pointed out, however, that the dimensions of the modified Imhoff tank of the present invention are not at all critical, since the present invention is applicable to any standard Imhoff tank of any conventional size. The essence of the invention is in the modifications discussed above converting the Imhoff tank from an anaerobic device to an activated sludge facility and thereby greatly increasing the efficiency of the device.

In addition to the square or rectangular Imhoff tanks of the type shown in the figures, the present invention is also applicable to round tanks (commonly known as Spirohof tanks) having the same, or similar, features as the Imhoff tank. More specifically, a round Spirohof tank has a center settling compartment in the shape of, e.g. a circle smaller than and concentric with the outer, larger circle forming the tank walls. The bottom of the tank may be provided with sloping walls, as may the lower portion of the inner settling compartment which define a slot communicating between the settling compartment and the lower portion of the outer chamber. Normally, the feed is to the settling compartment but, according to the present invention, the feed would be relocated to the outer (annular) chamber. The exit, of course, would still be located in the inner settling compartment. The modifications necessary to convert the conventional Spirohof tank to an activated sludge facility are the same as those required for the Imhoff tank; i.e., the feed is relocated to the outer (annular) chamber, air sparges are installed in the lower portion of the outer chamber and a pump is provided with its suction end disposed near the bottom of the outer chamber (i.e. near the point of the "cone" formed by the sloping bottom walls of the tank) and its discharge end disposed above the liquid level at the top of the outer (annular) chamber.

While the invention has been shown with reference to preferred embodiments, it is to be understood that various modifications and changes may be made by those skilled in the art without departing from the spirit and scope of the present invention, as defined in the appended claims.

What is claimed is:

1. An apparatus for treating and purifying wastewater containing organic pollutants comprising:
   1. a vessel having vertical end and sidewalls and a bottom portion in the shape of an inverted pyramid;
   2. an inner settling compartment within said vessel and smaller than said vessel defined by vertical walls extending from one side of said vessel to its opposite side, and inclined lower portions which define a slot communicating between said settling compartment and the lower portion of said vessel, the vertical walls of said settling compartment being separated from the vertical walls of said vessel and defining a first space therebetween;
   3. a plurality of air sparges disposed in the lower portion of said vessel to aerate the wastewater therein;
   4. means to feed said wastewater into said first space;
   5. air-lift pump means having its suction end disposed near the apex of said inverted pyramid and its discharge end disposed in said first space above the level of wastewater in said first space;
   6. means for removing the sludge that accumulates in the apex of inverted pyramid; and
   7. exit means in one end of said vessel within said inner settling compartment; wherein the wastewater fed to said first space descends in said vessel, is aerated in the lower portion thereof and then flows upwardly through said slot and out from said vessel through said exit means, wherein a bed of sludge is established in the lower portion of said settling compartment through which the aerated wastewater must flow, upwardly thereby further purifying said wastewater.

2. The apparatus of claim 1 wherein said exit means comprises a weir over which the clarified water in the upper portion of said settling compartment can flow.

3. The apparatus as claimed in claim 1, wherein said slot is a minimum of 6 inches in width.

4. An apparatus for treating and purifying wastewater containing organic pollutants comprising:
   1. a circular vessel having a circular side wall and a bottom portion in the shape of an inverted cone;
   2. an inner settling compartment within said vessel and defined by a circle smaller than the larger circle forming said vessel, said inner settling compartment having inclined lower portions which define a slot communicating between said settling compartment and the bottom portion of said vessel, the vertical circular wall of said settling compartment being separated from the vertical circular wall of said vessel and defining an annular space therebetween;
   3. a plurality of air sparges disposed in the lower portion of said vessel to aerate the wastewater therein;
   4. means to feed said wastewater into said annular space;
   5. a pump means having its suction end disposed near the point of said inverted cone and its discharge end disposed in said annular space above the level of wastewater in said annular space; and
   6. exit means in said vessel within said inner settling compartment; wherein the wastewater fed to said annular space descends in said vessel, is aerated in the lower portion thereof and then flows upwardly through said slot and out from said vessel through said exit means, wherein a bed of sludge is established in the lower portion of said settling compartment through which the aerated wastewater must flow upwardly thereby further purifying said wastewater.

* * * * *